April 6, 1926.
B. P. JOYCE
1,579,484
ADJUSTABLE AXLE PIVOT PIN FOR GUN CARRIAGES
Filed Dec. 3, 1924  2 Sheets-Sheet 1
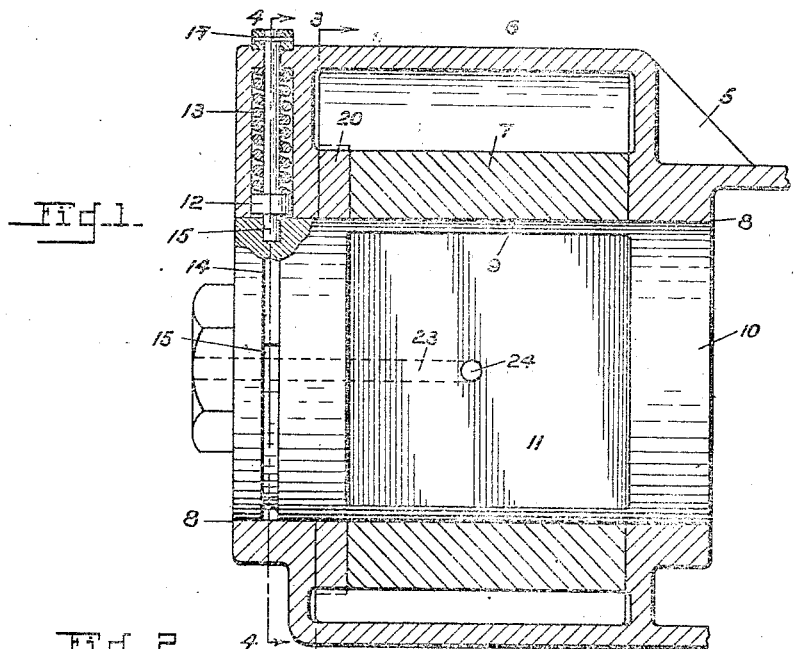
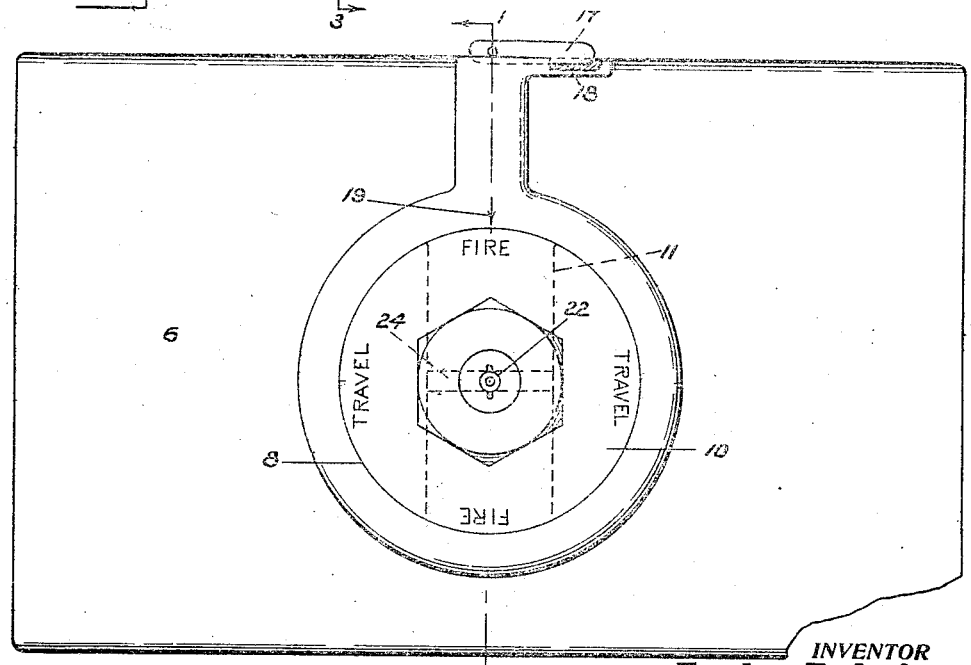
INVENTOR
Bryan P. Joyce
BY W. N. Roach
ATTORNEY Patented Apr. 6, 1926.

1,579,484

UNITED STATES PATENT OFFICE.

BRYAN P. JOYCE, OF DAVENPORT, IOWA.

ADJUSTABLE AXLE PIVOT PIN FOR GUN CARRIAGES.

Application filed December 3, 1924. Serial No. 753,604.

*To all whom it may concern:*

Be it known that I, BRYAN P. JOYCE, a citizen of the United States, and a resident of Davenport, county of Scott, and State of Iowa, have invented an Improvement in Adjustable Axle Pivot Pins for Gun Carriages, of which the following is a specification.

The subject of this invention is an adjustable axle pivot pin for gun carriages.

In the construction of wheeled gun mounts it is desirable that the lower carriage be connected to the axle in such a manner that the mount may travel over rough ground without injurious shocks and strain and that the connection may be rendered comparatively rigid and free from vibration when the gun is in the firing position.

In traveling the carriage is hung from the axle by resilient connections, means being provided to prevent unrestrained lateral movement of the axle with respect to the carriage while permitting complete freedom of movement in a vertical plane. To convert the mount from the traveling to the firing position it has been customary to insert a rigid connection between the carriage and axle.

The principal object of the present invention is to provide a permanently assembled rigid connection between the carriage and axle which may be adjusted to inoperative position to permit relative vertical movement of the carriage and axle when the wheeled gun mount is to be resiliently supported in travel.

Other objects of the invention are to provide novel means for securing the rigid connection against removal and against rotation and to support from the connection means for preventing lateral movement of the axle while permitting vertical freedom thereof.

To these and other ends, my invention consists in the construction, arrangement, and combination of elements as described hereinafter and pointed out in the claims forming a part of this specification.

A practical embodiment of my invention is illustrated in the accompanying drawings, wherein:

Fig. 1 is a sectional view on the line 1—1 of Fig. 2;

Fig. 2 is a front elevation of the axle housing;

Figure 3:
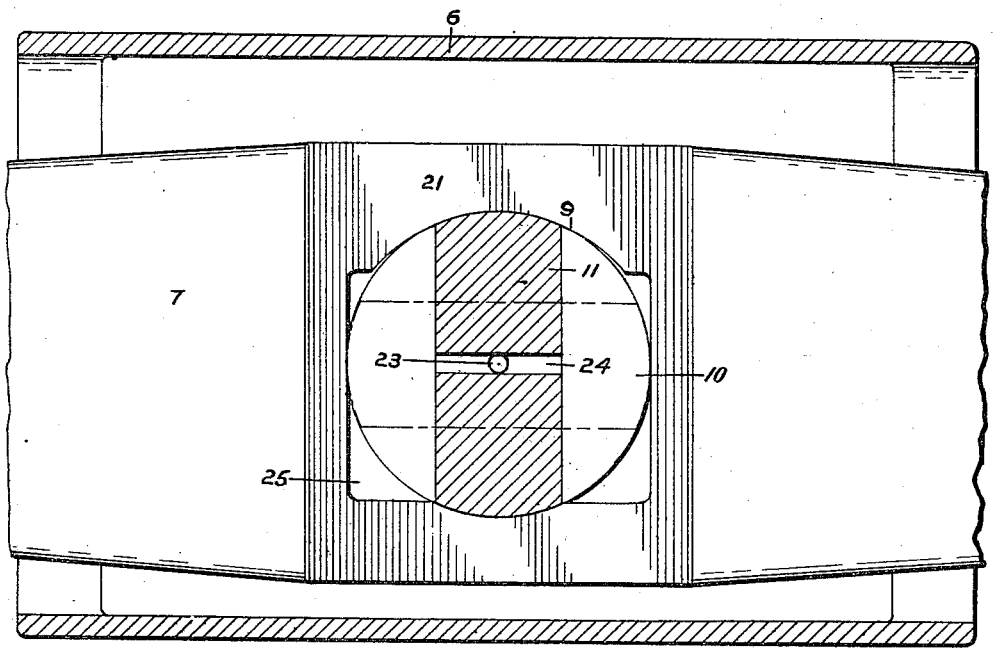
Fig. 3 is a sectional view on the line 3—3 of Fig. 1, the pivot pin adjusted for rigidly connecting the carriage and axle.
Figure 4:
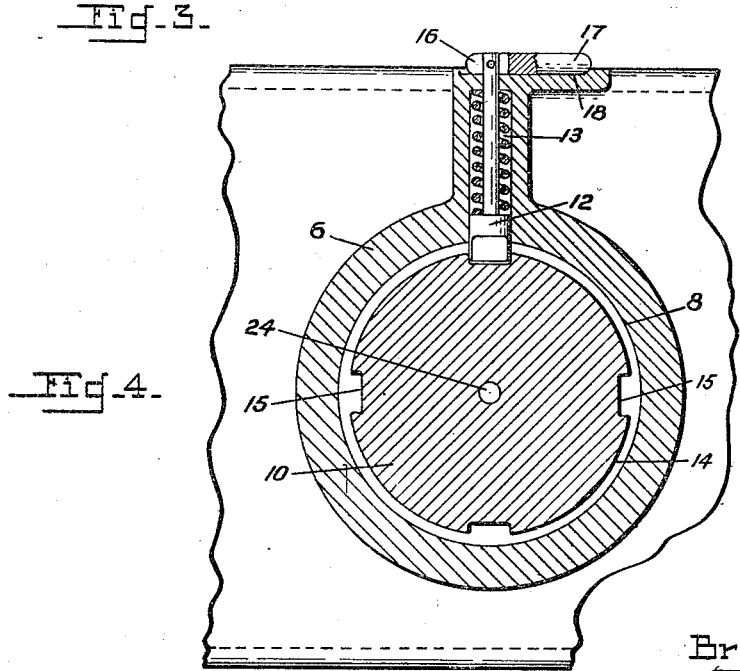
Fig. 4 is a sectional view on the line 4—4 of Fig. 1.

Referring to the drawings by numerals of reference:

The lowered carriage of a wheeled gun mount is shown at 5 and includes a housing 6 in which is disposed an axle 7. The front and rear vertical walls of the housing are formed with aligned apertures 8—8. An irregular aperture 9 of partially circular and partially squared outline is also formed in the axle so that when the apertures 8 and 9 are in alignment an axle pivot pin 10 may be inserted therethrough.

The pin 10 is of the usual cylindrical type except that its central portion which is disposed in the aperture of the axle is symmetrically cut away to form an oblong portion 11, whose width is preferably that of the curved portion of the aperture 9. The axle pin is held against removal by means of a plunger 12 which is normally forced by its spring 13 into an annular groove 14 in the forward end of the pin while the groove is further provided with equally spaced recesses 15, preferably four in number, into which the plunger may enter to prevent rotation of the pin.

The upper extremity of the plunger 12, which is mounted in the housing, is partially received in the slotted end 16 of a handle 17 so that when the handle is turned to the vertical position the plunger will be automatically cammed upwards a sufficient distance to withdraw it from the recess 15 and permit adjustment of the axle pin 10. When the handle is in the lower or horizontal position, it may fit into a socket 18 in the housing 6 to prevent operation of the handle.

As an indication of the angular position of the oblong portion 11 of the pin 10, the forward exposed face of the pin bears the legends "Fire" and "Travel" corresponding respectively to the curved and plain surfaces of the oblong portion 11. A marker 19 on the housing when in register with either of the legends serves to indicate when the oblong portion 11 is in vertical adjustment for firing or in horizontal adjustment for traveling. By reference to Figure 3, it will be noted that when the pin is adjusted for firing the oblong portion 11 will be, as shown in full lines, in the vertical position, its curved faces contacting the wall of the opening 9 in the axle to provide a rigid connection between the carriage and the axle. When the pin is turned through 90° the oblong portion assumes the travel or horizontal position shown in dotted lines whence the carriage is permitted limited vertical movement with respect to its axle under restraint of any suitable resilient connection as described in my Patent No. 1,447,085.

For the purpose of preventing lateral movement of the axle without interfering with freedom of movement in a vertical plane there is provided a rectangular connecting member 20 interposed between the axle and the housing and fitting in a similarly shaped recess 21 in the axle as shown in my Patent No. 1,489,889. In the present instance, however, the member 20 is supported by the axle pivot pin 10 on which it is snugly mounted.

The forward face of the pivot pin is axially provided with a convenient entry or valve indicated at 22 for the purpose of admitting lubricant through communicating passages 23 and 24 to the chamber 25 in the axle.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

I claim:

1. A wheeled gun mount including a carriage, an axle housing formed on the carriage and provided with apertures, an axle loosely mounted in the housing and provided with an irregular aperture, a pivot pin having cylindrical end portions disposed in the apertures of the housing and an oblong central portion disposed in the aperture of the axle, said oblong portion adapted when in vertical adjustment to contact the axle to lock the same against rectilinear movement relative to the housing and when in horizontal adjustment to permit relative vertical movement of the axle and housing, means for indicating the angular position of the oblong portion, means whereby the pivot pin may be turned, the forward end of the pin provided with a peripheral groove having spaced recesses, a plunger mounted in the housing and normally engaging in one of said recesses, a handle pivoted to the plunger and socketed in the housing, said handle on being rotated adapted to withdraw the plunger from its recess to permit turning but not removal of the pin, said pin further provided with passages for admitting a lubricant to the interior of the axle and means mounted on the pin and adapted to prevent lateral movement of the axle while permitting vertical movement thereof.

2. A wheeled gun mount including a carriage, an axle housing formed on the carriage and provided with apertures, an axle loosely mounted in the housing and provided with an irregular aperture, a pivot pin having cylindrical end portions disposed in the apertures of the housing and an oblong central portion disposed in the aperture of the axle, said oblong portion adapted when in vertical adjustment to contact the axle to lock the same against rectilinear movement relative to the housing and when in horizontal adjustment to permit relative vertical movement of the axle and housing, means for indicating the angular position of the oblong portion, means whereby the pivot pin may be turned, the forward end of the pin provided with a peripheral groove having spaced recesses, a plunger mounted in the housing and normally engaging in one of said recesses and a handle pivoted to the plunger and socketed in the housing, said handle on being rotated adapted to withdraw the plunger from its recess to permit turning but not removal of the pin.

3. A wheeled gun mount including a carriage, an axle housing formed on the carriage and provided with apertures, an axle loosely mounted in the housing and provided with an aperture, a pivot pin having cylindrical end portions disposed in the apertures of the housing and an oblong central portion disposed in the aperture of the axle, said oblong portion adapted when in vertical adjustment to contact the axle to lock the same against rectilinear movement relative to the housing and when in horizontal adjustment to permit relative vertical movement of the axle and housing, means for indicating the angular position of the oblong position, means whereby the pivot pin may be turned, and means mounted in the housing and adapted when in locking position to prevent turning of the pin and when unlocked to permit turning but not removal thereof.

4. A wheeled gun mount including a carriage, an axle housing formed on the carriage and provided with apertures, an axle looosely mounted in the housing and provided with an aperture, a pivot pin passing through the apertures in the housing and axle, said pin adapted when in one position of adjustment to oppose relative rectilinear movement between the housing and axle and when in another position of adjustment to permit relative vertical movement of said members, means for indicating the adjustments and means for normally holding the pivot pin against removal and against turning.

5. A wheeled gun mount including a carriage provided with aligned apertures, an axle loosely mounted in the carriage and provided with an aperture, a pivot pin passing through the apertures in the housing and axle, said pin adapted when in one position of adjustment to oppose relative rectilinear movement between the housing and axle and when in another position of adjustment to permit relative vertical movement of the housing and axle.

6. A wheeled gun mount including a carriage, an axle, means for securing the carriage against rectilinear movement relative to the axle, said means adjustable to inoperative position to permit relative vertical movement of the carriage and axle.

7. A wheeled gun mount including a carriage, an axle therefor, and a pivot pin adjustable to form a pivotal or loose connection between the carriage and axle.

8. A wheeled gun mount including a carriage, an axle, a pivot pin adjustable to form a pivotal or loose connection between the carriage and axle, a plunger mounted in the carriage for engaging the pin, a handle pivoted to the plunger, said handle on being turned adapted to disengage the plunger sufficiently to permit adjustment of the pin but not removal thereof.

9. A wheeled gun mount including a carriage, an axle therefor, a pivot pin adjustable to form a pivotal or loose connection between the carriage and axle, and means when in one position adapted to permit adjustment of the pin but not removal and when in another position adapted to lock the pin in adjustment.

10. A wheeled gun mount including a carriage, an axle therefor, a pivot pin adjustable to form a pivotal or loose connection between the carriage and axle, and means mounted on the pin for preventing lateral movement of the axle, while permitting vertical movement of the axle with respect to the carriage when the pivot pin is adjusted to form a loose connection.

BRYAN P. JOYCE.